US010072791B2

(12) United States Patent
Beta

(10) Patent No.: US 10,072,791 B2
(45) Date of Patent: Sep. 11, 2018

(54) UTILITY CADDY

(71) Applicant: Frank Daniel Beta, Mastic, NY (US)

(72) Inventor: Frank Daniel Beta, Mastic, NY (US)

(*) Notice: Subject to any disclaimer, the term of this patent is extended or adjusted under 35 U.S.C. 154(b) by 0 days.

(21) Appl. No.: 15/073,419

(22) Filed: Mar. 17, 2016

(65) Prior Publication Data
US 2016/0271999 A1    Sep. 22, 2016

Related U.S. Application Data
(60) Provisional application No. 62/134,075, filed on Mar. 17, 2015.

(51) Int. Cl.
*B44D 3/12*     (2006.01)
*F16M 11/28*    (2006.01)
*F16M 11/42*    (2006.01)
*A47B 45/00*    (2006.01)
*A47B 81/00*    (2006.01)
*B44D 3/14*     (2006.01)
*F16M 11/04*    (2006.01)

(52) U.S. Cl.
CPC ............ *F16M 11/42* (2013.01); *A47B 45/00* (2013.01); *A47B 81/00* (2013.01); *B44D 3/123* (2013.01); *B44D 3/14* (2013.01); *F16M 11/046* (2013.01); *F16M 11/28* (2013.01); *F16M 2200/028* (2013.01)

(58) Field of Classification Search
CPC ....... A47B 81/00; A47B 81/005; A47B 81/02; A47B 45/00; B44D 3/123; F16M 11/28
USPC .................... 211/65, 66, 196, 205; 248/125.8
See application file for complete search history.

(56) References Cited

U.S. PATENT DOCUMENTS

| 338,923 | A | * | 3/1886 | Carr .................. D06F 57/04 |
| | | | | 211/171 |
| 755,484 | A | * | 3/1904 | Hargrove .......... A47G 25/0664 |
| | | | | 211/196 |
| 1,038,198 | A | * | 9/1912 | Randall et al. .......... A47F 5/04 |
| | | | | 211/205 |
| 1,065,381 | A | * | 6/1913 | Martin ................ A47K 1/09 |
| | | | | 211/166 |
| 1,089,290 | A | * | 3/1914 | Thompson ............. F16M 11/00 |
| | | | | 211/205 |
| 1,107,075 | A | * | 8/1914 | Karges ................ A61B 6/4464 |
| | | | | 211/196 |
| 1,381,663 | A | * | 6/1921 | Roeder .................. B25B 1/2484 |
| | | | | 211/86.01 |
| 1,471,909 | A | * | 10/1923 | Miller ................... A47F 5/10 |
| | | | | 16/DIG. 39 |
| 1,510,661 | A | * | 10/1924 | Ellingsen .......... A47G 25/0664 |
| | | | | 211/196 |
| 1,763,748 | A | * | 6/1930 | Best ..................... F16B 12/48 |
| | | | | 211/196 |

(Continued)

*Primary Examiner* — Stanton L Krycinski
(74) *Attorney, Agent, or Firm* — Grimes LLC

(57) ABSTRACT

The present invention generally relates to a utility caddy which provides a stable, portable, and vertically adjustable work-surface and tool/material organization platform for permitting requisite tools and materials to be held in an organized and readily accessible manner, at any height, in any of a myriad of applications such as painting or installing drywall. The utility caddy comprises a base, a longitudinally adjustable support member, and a receptacle which, in the preferred embodiment, contains a plurality of slots for holding variously dimensioned tools and containers for materials.

16 Claims, 4 Drawing Sheets

(56) References Cited

U.S. PATENT DOCUMENTS

| | | | | |
|---|---|---|---|---|
| 1,764,072 A * | 6/1930 | William | A47J 47/16 | 211/196 |
| 1,804,913 A * | 5/1931 | Brunhoff | A47F 5/02 | 211/163 |
| 2,247,774 A * | 7/1941 | Forsyth | A47G 25/0664 | 211/196 |
| 2,376,955 A * | 5/1945 | Ball | A47B 81/005 | 211/60.1 |
| 2,952,364 A * | 9/1960 | Jacobson | B44D 3/123 | 211/65 |
| 2,988,837 A * | 6/1961 | Hutton | A47G 33/06 | 156/61 |
| 3,292,796 A * | 12/1966 | Paige | A47F 5/114 | 211/132.1 |
| 3,637,179 A * | 1/1972 | Marschak | A47B 91/00 | 211/205 |
| 3,642,145 A * | 2/1972 | Shelton | B65F 1/141 | 211/167 |
| 3,826,378 A * | 7/1974 | Novak | A63C 11/028 | 211/166 |
| 4,171,790 A * | 10/1979 | Crescenti | A47G 7/041 | 248/27.8 |
| 4,223,859 A | 9/1980 | Erickson | | |
| 4,688,685 A * | 8/1987 | Brace | A63C 11/028 | 211/60.1 |
| 4,746,022 A * | 5/1988 | Benham | A47F 5/04 | 211/195 |
| 4,756,429 A * | 7/1988 | Lehman | A47F 7/148 | 211/163 |
| 5,211,295 A * | 5/1993 | Dunn | A47F 5/02 | 211/163 |
| D338,310 S | 8/1993 | Clarke | | |
| 5,445,352 A * | 8/1995 | Long | B66F 3/00 | 248/188.5 |
| 5,487,475 A * | 1/1996 | Knee | A47G 25/005 | 211/70.8 |
| 5,738,229 A * | 4/1998 | Fairweather | A63B 55/10 | 211/70.2 |
| 5,906,284 A | 5/1999 | Hammerstrom | | |
| 6,386,491 B1 * | 5/2002 | Bissett | A47F 5/04 | 211/205 |
| 6,508,390 B1 | 1/2003 | Karpati | | |
| 6,612,533 B2 | 9/2003 | Biles | | |
| 7,293,748 B1 | 11/2007 | Hoser | | |
| 7,857,149 B2 * | 12/2010 | Cummins | A47B 49/00 | 211/60.1 |
| 8,020,716 B2 * | 9/2011 | Vitale | A47B 57/06 | 211/197 |
| 8,435,377 B1 | 5/2013 | Greenhalgh | | |
| 8,720,706 B2 * | 5/2014 | Robbins, III | A47F 5/02 | 211/133.1 |
| 2007/0039912 A1 * | 2/2007 | Hinkens | B65H 75/06 | 211/71.01 |
| 2007/0175848 A1 * | 8/2007 | Mallen | A47G 25/0671 | 211/196 |
| 2007/0262035 A1 * | 11/2007 | Hoy | A47K 1/09 | 211/66 |
| 2008/0000865 A1 * | 1/2008 | Babcock | A47F 5/04 | 211/196 |
| 2009/0121095 A1 | 5/2009 | Eighmie | | |
| 2009/0321590 A1 * | 12/2009 | Keller | B65F 1/141 | 248/125.8 |
| 2015/0360505 A1 * | 12/2015 | Beck | B44D 3/123 | 211/65 |

\* cited by examiner

UTILITY CADDY

CROSS-REFERENCE TO RELATED APPLICATION

This application claims priority to and the benefit of U.S. provisional patent application Ser. No. 62/134,075, filed on Mar. 17, 2015, the entire disclosures of which are hereby expressly incorporated herein by reference.

BACKGROUND OF THE INVENTION

Construction work such as painting or installing drywall can be labor intensive. Such work requires numerous tools which everyone from professional contractors to hobbyists find difficult to keep organized and readily accessible during use. For example, while installing drywall, contractors often use a hawk covered with fresh compound, drywall tape, trowels, and other tools all of which cannot be held at once. These difficulties are compounded by the fact that much of this work must be done while standing on a ladder or stepstool; unbalancing the worker and requiring numerous trips up and down the ladder to exchange tools that are strewn about the floor area below the ladder in an unorganized manner.

Some specialty tools were created to overcome these challenges. For example, U.S. Pat. No. 8,435,377 B1 (Greenhalgh) discloses a drywall tape dispenser assembly which may be used to simultaneously apply compound and drywall tape. However, such equipment is often used only on large projects by professional contractors. Moreover, such specialty tools only address a narrow segment of the broader problem. For example, Greenhalgh only addresses drywall installation difficulties, doing nothing to ease the difficulty of organizing and keeping readily accessible the variety of tools needed for painting or other construction work when working on a ladder or stepstool.

Several devices attempt a broader solution. For example, US 2009/0121095 A1 (Eighmie) discloses a paint can stand with an adjustable pole. Similarly, U.S. Pat. No. 7,293,748 (Hoser) discloses a vertically adjustable paint can stand, while U.S. Pat. No. 4,223,859 (Erickson) discloses a vertically adjustable pail assembly for holding plaster, mortar or other building materials. U.S. Pat. No. 6,612,533 (Biles) discloses a vertically adjustable support to help carpenters in installing cabinets and handrails, as does US Des. 338,310 (Clarke). Additionally, U.S. Pat. No. 5,906,284 (Hammerstrom) discloses a multi-workstation device used in mounting workshop equipment. However, these disclosures again provide limited functionality; only offering improvements to a narrow segment of the larger problem. None of them address, let alone solve, the larger problem of organizing and keeping readily accessible the requisite multiple tools and materials often used while working—often at a height.

U.S. Pat. No. 6,508,390 (Karpati) takes a different approach to the larger problem; namely, by hanging items off of a worker's belt. This approach undesirably reduces the worker's mobility with heavy, cumbersome, and soiled tools.

SUMMARY OF THE INVENTION

Unlike the prior art, the present invention solves the problem of organizing tools and materials in a readily accessible manner—including while working at a height—by providing a stable, portable, and vertically adjustable utility caddy which accommodates a wide variety of tools and materials. The present invention can be placed next to a ladder; allowing painters, drywall installers, and other workers to keep paint roller trays, drywall hawks, paintbrushes, trowels, and other tools and materials within arm's reach—even while working several feet off the ground.

The present invention can also adjust vertically for use while standing on the floor or while working at a height.

The preferred embodiment of the invention is comprised of three components: a base, a longitudinally adjustable support member, and a receptacle for holding the materials and tools in an organized, readily accessible manner. The preferred embodiment of the invention quickly disassembles for maximum portability and minimum storage space requirements. Each disassembled piece is designed to allow ease in manufacture, whether through casting, injection molding, or other manufacturing techniques. The receptacle portion of the present invention is sized to hold a variety of tools and materials. Foot slots on the receptacle accommodate standard paint roller trays, while larger finger slots comfortably fit drywall hawk handles, paint brushes, and many other hand tools. The preferred embodiment also has several rounded finger slots on the receptacle. These provide gradually narrowing openings that allow for even greater storage versatility.

DETAILED DESCRIPTION OF THE INVENTION

Figure 1:
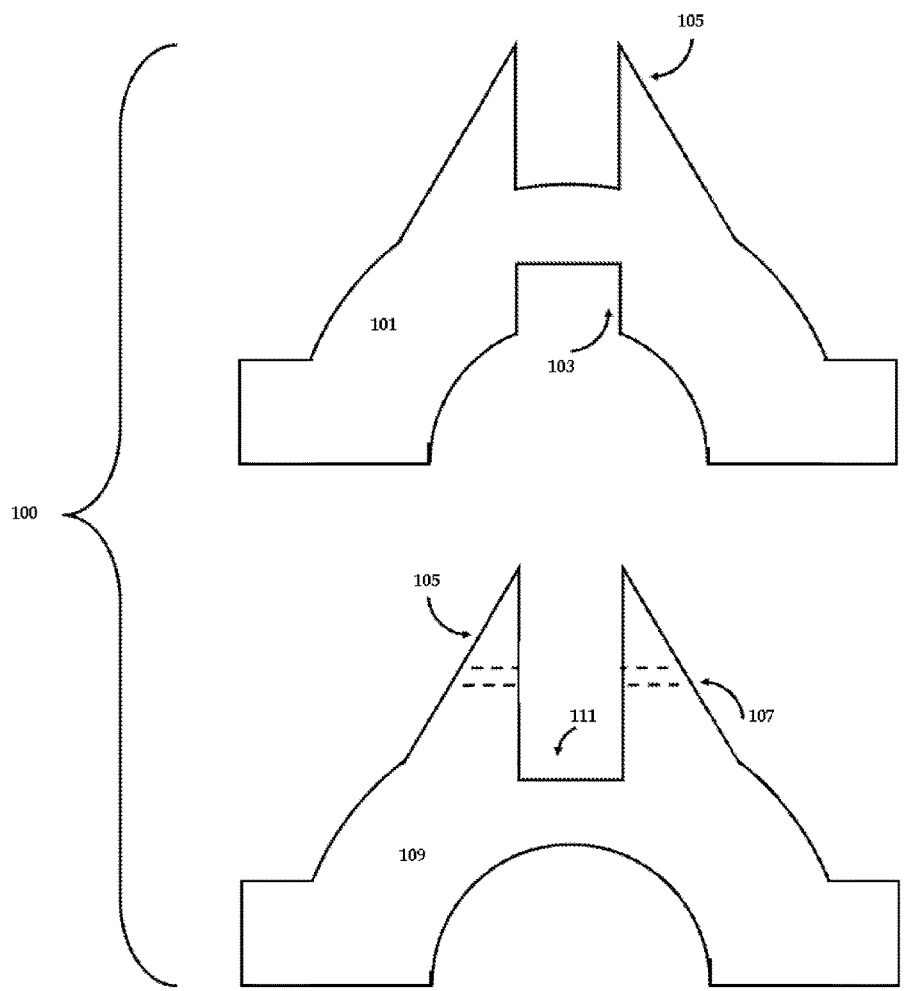
FIG. 1 is a front view of the fully disassembled base.
Figures 2A, 2B:
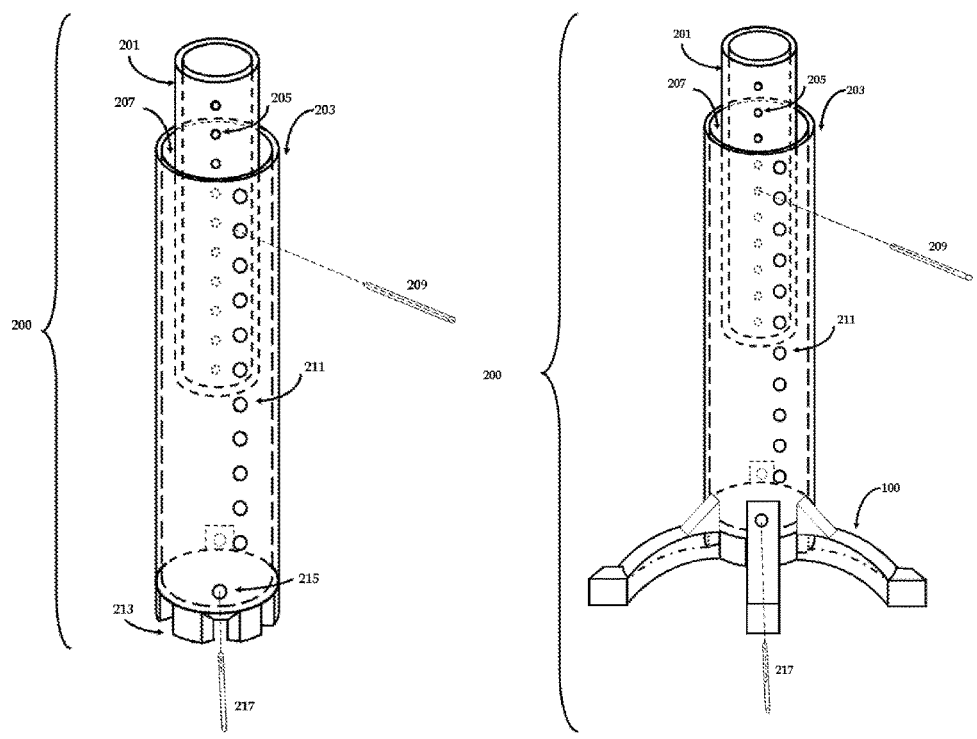
FIG. 2A is a projection view of the longitudinally adjustable support member unattached to the base.
FIG. 2B is a projection view of the longitudinally adjustable support member attached to the base.
Figure 3A:
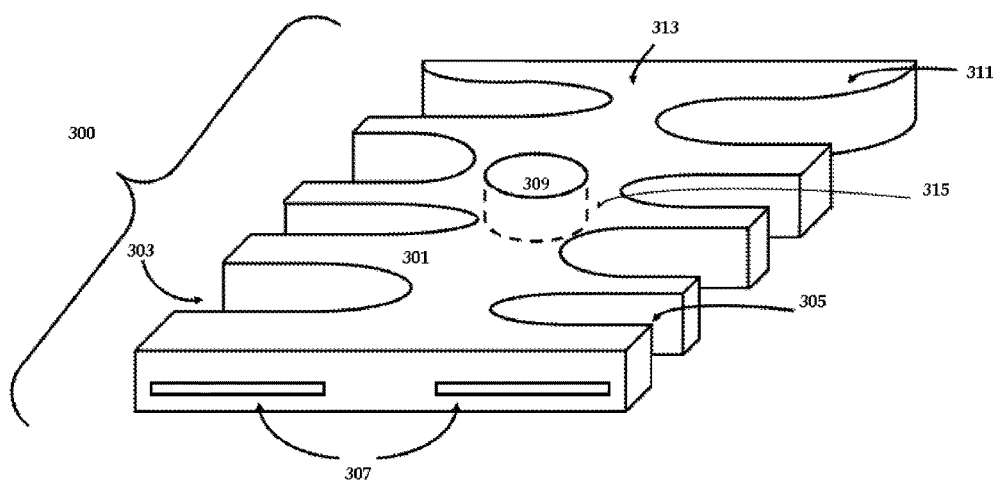
FIG. 3A is a top perspective view of the preferred embodiment of the receptacle.
Figure 3B:
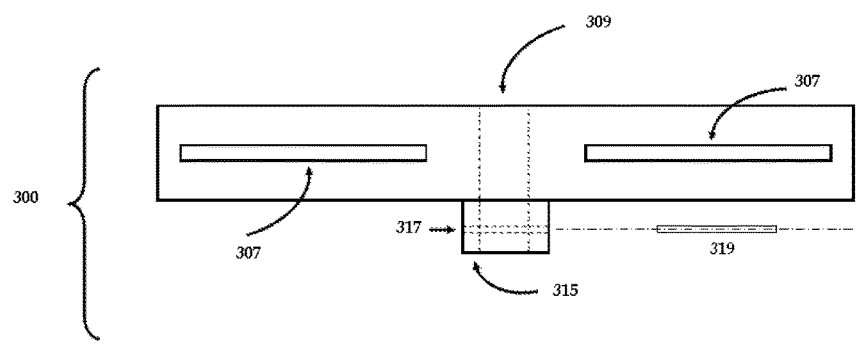
FIG. 3B is a front view of the preferred embodiment of the receptacle.
Figure 4:
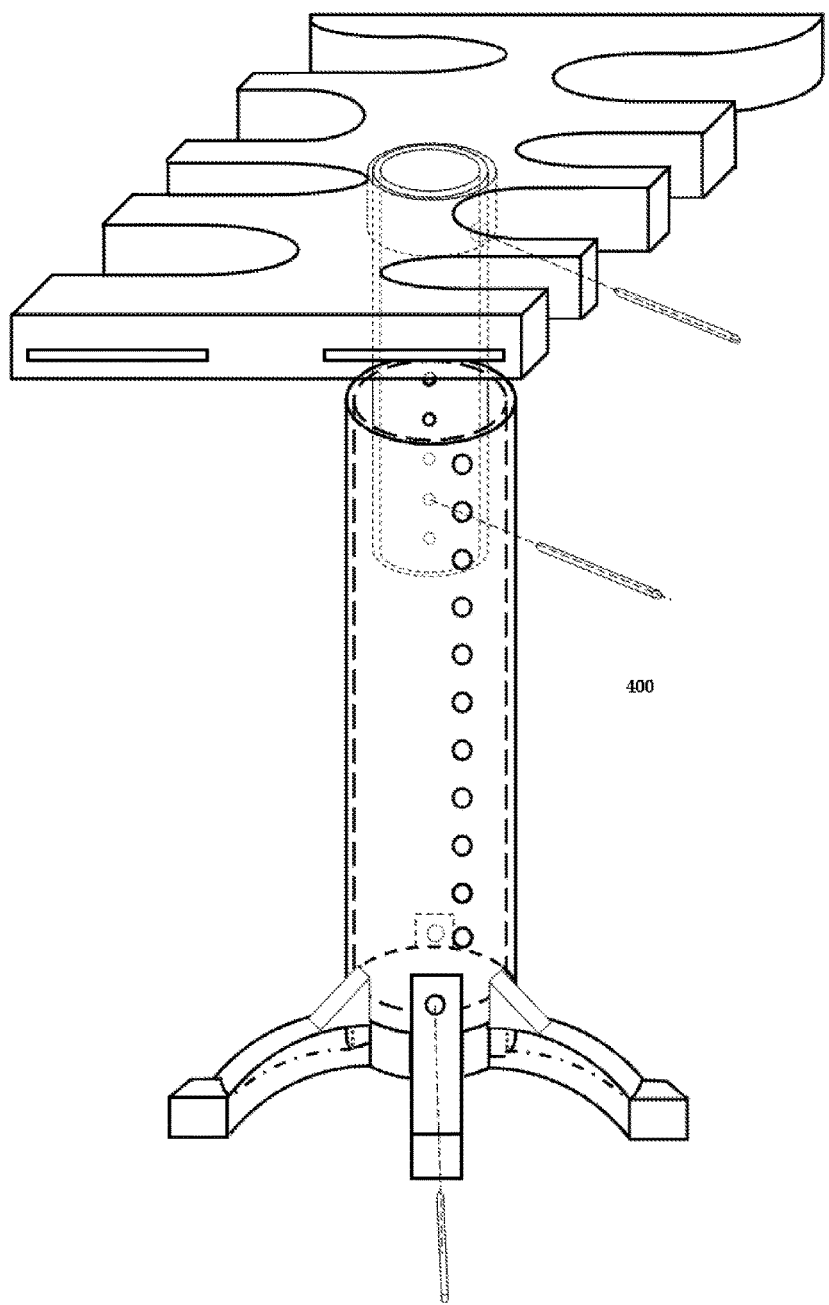
FIG. 4 is a projection view of the completely assembled Utility Caddy.

The Utility Caddy 400 comprises three basic elements: a Base 100, a Longitudinally Adjustable Support Member 200 and a Receptacle 300 as shown in FIG. 1-4. The Base 100 may be of several configurations. In alternate embodiments the base is mounted on wheels or rollers. FIG. 1 shows the preferred embodiment of the Base 100 wherein the Base 100 may be fully disassembled into an Upper Base Member 101 and a Lower Base Member 109. The Upper Base Member 101 has an Upper Base Member Notch 103 while the Lower Base Member 109 has a Lower Base Member Notch 111. The Upper Base Member Notch 103 and the Lower Base Member Notch 111 are of substantially the same size and shape; allowing them to fit into one another to create the Base 100. This configuration is commonly referred to as an edge cross lap joint. This design provides rigidity to the Base 100 while permitting the Base 100 to be fully disassembled, which makes the Utility Caddy 400 highly portable.

The Base 100 and the Longitudinally Adjustable Support Member 200 are connected by first locking means. One such first locking means shown in the preferred embodiment includes the use of four Base Fins 213 dimensioned to fit into the cross shaped Base 100 formed by the combination of the Upper Base Member 101 and the Lower Base Member 109. In the preferred embodiment, the Upper Base Member 101 and the Lower Base Member 109 each have two protruding Base Member Shoulders 105. When the Utility Caddy 400 is fully assembled, these Base Member Shoulders 105 rest in contact with the Outer Housing 203 as part of the interlocking design between the Base 100 and the Base Fins 213. These Base Member Shoulders further rigidify the Base 100 and Longitudinally Adjustable Support Member 200 assembly; guarding against unwanted movement.

The Base 100 and the Longitudinally Adjustable Support Member 200 are further held in place in the preferred embodiment by the use of a Base Pin 217 which may be placed through the Shoulder Pin Hole 107 and the Base Hole 215. The Longitudinally Adjustable Support Member 200 has an Inner Column 201 and an Outer Housing 203. The Inner Column 201 telescopingly slides freely within an Internal Hollow Chamber 207 inside the Outer Housing 203. The Inner Column 201 may be longitudinally adjusted as desired within this Internal Hollow Chamber 207. Once the Inner Column 201 is at a desired position, the Inner Column 201 may be held in place by using a height adjustment means. In the preferred embodiment, this height adjustment means takes the form of a Longitudinal Adjustment Pin 209 which is extended through both an Outer Housing Hole 211 and an aligned Inner Column Hole 205.

The Longitudinally Adjustable Support Member 200 is connected to the Receptacle 300 by second locking means. One such second locking means is the use of a pin through the downwardly extending portion of the Receptacle 300. This downwardly extending portion is shown in the preferred embodiment as a Receptacle Collar 315 having a Receptacle Collar Hole 317. A Receptacle Collar Pin 319 may be placed through this Receptacle Collar Hole 317 and an Inner Column Hole 205 to secure the Receptacle 300 to the Longitudinally Adjustable Support Member 200.

The preferred embodiment of the Receptacle 300 is roughly rectangular; having a multitude of Finger Slots 303. In the preferred embodiment, these Finger Slots 303 are adjacent to the Receptacle Edge 305; forming a Finger Slot 303 which is only partially encircled by the Receptacle Platform 301. In the preferred embodiment, these Finger Slots 303 are of varying lengths and widths to accommodate a multitude of common tools and containers. In the preferred embodiment, there are also several Rounded Finger Slots 311 which provide further versatility in the number and variety of tools and containers the Utility Caddy 400 accommodates. The Receptacle 300 also has a multitude of Foot Slots 307 to accommodate the feet of common paint trays and other similar containers. In the preferred embodiment, the Receptacle Hole 309 is located in the approximate center of mass of the Receptacle 300 to ensure the stability of the Utility Caddy 400.

I claim:

1. A utility caddy comprising:
   a. a base;
   b. a longitudinally adjustable support member having an upper end and a lower end;
   c. first attachment means for detachably locking said lower end to said base;
   d. said longitudinally adjustable support member further comprising an inner column having a plurality of inner column holes and an outer housing having a plurality of outer housing holes; said inner column telescopingly positioned for sliding movement within said outer housing; said inner column holes and said outer housing holes being spaced and dimensionally sized for selective alignment as said inner column telescopingly slides within said outer housing;
   e. height adjustment means;
   f. a receptacle for organized retention of tools and materials which is generally flat and has at least one peripheral edge; said receptacle having:
      (i) a plurality of finger slots including at least one finger slot which is roughly rectangular; and
      (ii) at least one elongated foot slot on said peripheral edge; and
   g. second attachment means for detachably locking said receptacle to said upper end of said longitudinally adjustable support member.

2. The utility caddy of claim 1 wherein said plurality of finger slots includes at least one finger slot which is of varying dimensions with respect to at least one other finger slot.

3. The utility caddy of claim 1 wherein said plurality of finger slots includes at least one finger slot which is adjacent to said peripheral edge of said receptacle such that said at least one finger slot forms a notch in the receptacle.

4. The utility caddy of claim 1 wherein said receptacle has at least two foot slots.

5. The utility caddy of claim 4 wherein said at least two of foot slots includes at least one foot slot which is dimensionally sized to accommodate and steady a foot of a paint tray.

6. The utility caddy of claim 4 wherein said at least two of foot slots includes at least one foot slot which is dimensionally sized to accommodate and steady a foot of a part-holding tray.

7. The utility caddy of claim 1 wherein said second attachment means comprises a downwardly extending portion of said receptacle dimensionally sized to fit over said inner column and having a hole such that a pin can be placed through both a hole in said inner column and said hole in said downwardly extending portion.

8. The utility caddy of claim 1 wherein:
   a. said base comprises an upper base member having an upper base member notch and a lower base member having a lower base member notch, with said notches being dimensionally sized to allow said base members to interlock; and,
   b. said lower end of said longitudinally adjustable support member has a plurality of base fins dimensionally sized to accommodate said base members when said base members are interlocked.

9. The utility caddy of claim 8 wherein:
   a. said base members each have two base member shoulders;
   b. said base member shoulders are dimensionally sized to interdigitally align with said base fins;
   c. a base hole located near said lower end of said longitudinally adjustable support member and a shoulder hole located in at least one of said base member shoulders; and
   d. a base pin which secures said base to said longitudinally adjustable support member by passing through said base hole and said shoulder hole.

10. The utility caddy of claim 1 wherein said base includes a plurality of rollers.

11. The utility caddy of claim 1 wherein said base includes a plurality of wheels.

12. The utility caddy of claim 1 wherein said height adjustment means comprises a pin detachably connected to said longitudinally adjustable support member and capable of securing said inner column to said outer housing once said pin is placed through one of said inner column holes and one of said outer housing holes.

13. A utility caddy comprising:
a. a base comprising an upper base member having an upper base member notch and a lower base member having a lower base member notch with said notches dimensionally sized to allow said base members to interlock;
b. a longitudinally adjustable support member having an upper end and a lower end with said lower end detachably affixed to said base, with said longitudinally adjustable support member further comprising an inner column having a plurality of inner column holes and an outer housing with said outer housing having a plurality of outer housing holes dimensionally sized to align with said inner column holes and with said outer housing holes extending from an external surface of said outer housing into an internal hollow chamber with said hollow chamber dimensionally sized such that said inner column can fit into said hollow chamber, and said lower end of the longitudinally adjustable support member having a plurality of base fins dimensionally sized to accommodate said interlocked base members
c. a height adjustment means; and
d. a receptacle detachably affixed to said upper end of said longitudinally adjustable support member, said receptacle having at least one peripheral edge with at least one elongated foot slot on said peripheral edge, said receptacle having a plurality of finger slots including at least one finger slot which is roughly rectangular.

14. The utility caddy of claim 13 wherein said receptacle is detachably affixed to said upper end of said longitudinally adjustable support member by means of a downwardly extending portion of said receptacle dimensionally sized to fit over said inner column and having a hole such that a pin can be placed through both said inner column and said downwardly extending portion.

15. The utility caddy of claim 13 wherein said receptacle has at least two roughly rectangular finger slots adjacent to an edge of the receptacle such that said finger slots form notches in said receptacle.

16. A utility caddy comprising:
a. a base; said base comprising an upper base member having an upper base member notch and a lower base member having a lower base member notch; said notches dimensionally sized to allow said base members to interlock; each of said base members having two base member shoulders; said base having a shoulder hole located in at least one of said base member shoulders;
b. a longitudinally adjustable support member having an upper end and a lower end;
c. first attachment means for detachably attaching said lower end to said base; said first attachment means comprising a base hole located near said lower end of said longitudinally adjustable support member and a base pin which secures said base to said longitudinally adjustable support member by passing through said base hole and said shoulder hole;
d. said longitudinally adjustable support member further comprising an inner column having a plurality of inner column holes and an outer housing having a plurality of outer housing holes, said inner column telescopingly positioned for sliding movement within said outer housing; said inner column holes and said outer column holes being spaced and dimensionally sized for selective alignment as said inner column telescopingly slides within said outer housing; said lower end of said longitudinally adjustable support member having a plurality of base fins dimensionally sized to accommodate said base members when said base members are interlocked;
e. height adjustment means; said height adjustment means comprising a pin detachably connected to said longitudinally adjustable support member and capable of securing said inner column to said outer housing once placed through one of the said inner column holes and one of the said outer housing holes;
f. a receptacle for organized retention of tools and materials which is generally flat and has at least one peripheral edge; said receptacle having a plurality of finger slots; said plurality of finger slots having at least one finger slot which is roughly rectangular; said plurality of finger slots having at least one finger slot of varying dimensions with respect to at least one other finger slot; said plurality of finger slots including at least one finger slot which is adjacent to said peripheral edge of said receptacle such that said at least one finger slot forms a notch in the receptacle; said receptacle having at least one elongated foot slot on said peripheral edge; said receptacle having a plurality of foot slots; said plurality of foot slots including at least one foot slot which is dimensionally sized to accommodate and steady a foot of a paint tray; said plurality of foot slots including at least one foot slot which is dimensionally sized to accommodate and steady a foot of a part-holding tray; and
g. second attachment means for detachably attaching said receptacle to said upper end of said longitudinally adjustable support member; said second attachment means comprising a downwardly extending portion of said receptacle dimensionally sized to fit over said inner column and having a hole such that a pin can be placed through said hole in said downwardly extending portion and one of said inner column holes.

* * * * *